Dec. 24, 1968 H. J. HERSHEY ET AL 3,418,431

CODE TRANSMITTER

Filed May 28, 1965 5 Sheets-Sheet 1

INVENTORS H. J. HERSHEY
C. W. MC GEE
M. L. WARNOCK

BY Harry L. Newman
ATTORNEY

CODE TRANSMITTER

Dec. 24, 1968 H. J. HERSHEY ET AL 3,418,431

CODE TRANSMITTER

Filed May 28, 1965 5 Sheets-Sheet 3

Dec. 24, 1968 H. J. HERSHEY ET AL 3,418,431

CODE TRANSMITTER

Filed May 28, 1965 5 Sheets-Sheet 4

United States Patent Office 3,418,431
Patented Dec. 24, 1968

3,418,431
CODE TRANSMITTER

Harold J. Hershey, Chester W. McGee, and Merville L. Warnock, Indianapolis, Ind., assignors to Bell Telephone Laboratories, Incorporated, New York, N.Y., a corporation of New York Filed May 28, 1965, Ser. No. 459,861
3 Claims. (Cl. 179—90)

ABSTRACT OF THE DISCLOSURE

A code transmitter includes a spring loaded printed circuit disc that is coupled by a clutch to a motor for rotation past a first plurality of spaced contacts to provide a first group of sequentially actuated switches. A second plurality of spaced contacts are linked to a relay for rotation past a printed circuit board to provide a second group of sequentially actuated switches that are interconnected with the first group in a switching matrix. The completion of the path through the switching matrix by the sequential actuation of the first group of switches results in the energization of the relay to actuate the next second switch in the sequence and to decouple the printed circuit disc from the motor and permit the spring to return the disc to a home position to reinitiate the sequential actuation of the first switches.

This invention relates to code transmitters in general and to automatic code transmitters in particular.

An illustrative embodiment of the automatic code transmitter of this invention includes a first and second plurality of switches, each second switch being connected to one of the first switches to form a switching matrix. Both the first and second switches are actuated sequentially, but only one second switch in actuated for each sequential actuation of the first switches. A second switch is actuated as the sequential actuation of the first switches commences, and when the first switch to which the actuated second switch is connected, is also actuated, a path is provided through the switching matrix. Upon this occurrence, the sequential actuation of the first switches is interrupted and re-initiated from the beginning, and the next second switch in the sequence of the second switches is actuated.

Means are provided for transmitting a pulse concurrent with each actuation of a first switch, and as a result, a train of pulses is transmitted for each sequential actuation of the first switches, the train of pulses corresponding in length to the number of first switches actuated.

A feature of this invention is that information is stored in the code transmitter in the form of particular connections between two sets of sequentially actuated switches.

A complete understanding of the invention and of this and other features and advantages thereof may be gained from consideration of the following detailed description taken in conjunction with the accompanying drawing wherein one embodiment of the invention is illustrated. It is to be expressly understood, however, that the drawing is for the purpose of illustration and description and is not to be construed as defining the limits of the invention.

Figure 1:
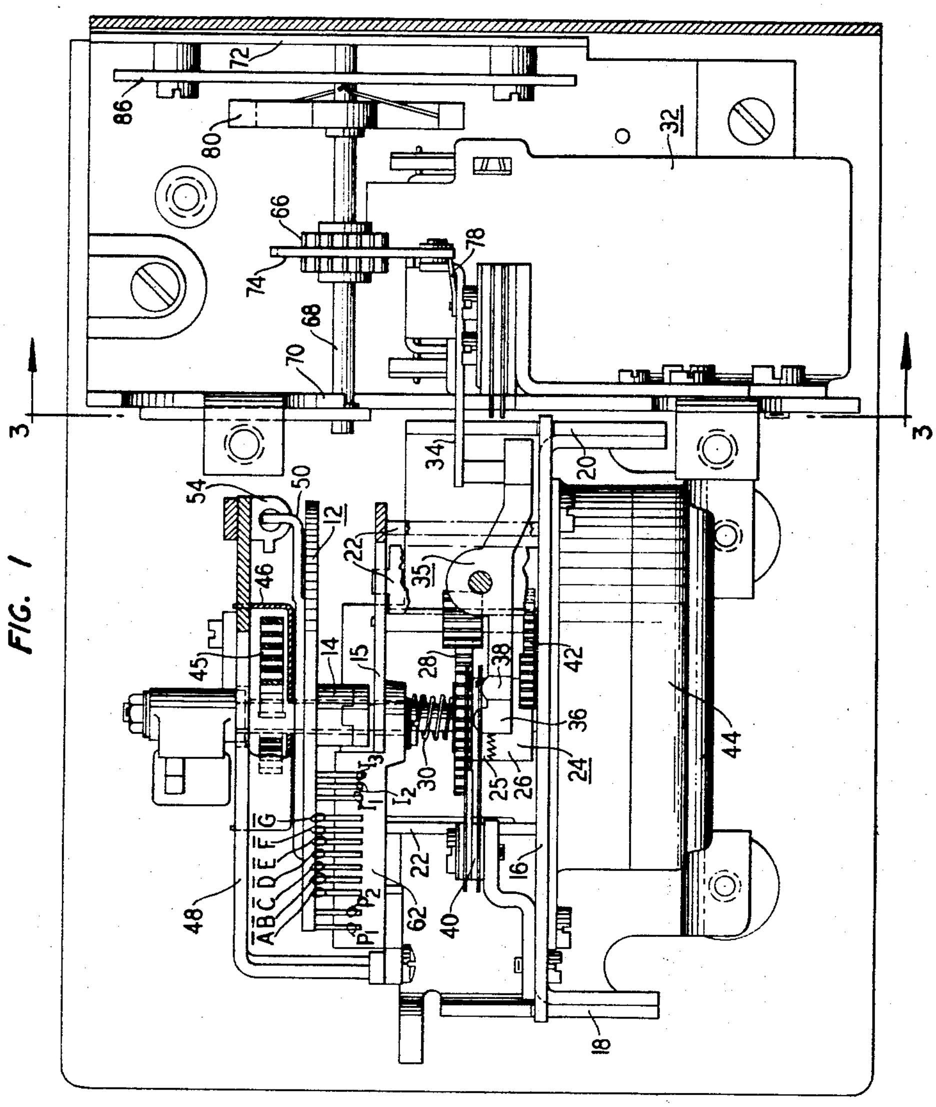
FIG. 1 is a front view of the code transmitter.

Referring to the drawing and to FIG. 1 in particular, the code transmitter includes a contact disc 12 mounted on a shaft 14 that is journaled between an upper support plate 15 and a lower support plate 16. The lower support plate 16 is secured to and extends between a pair of side plates 18 and 20, while the upper support plate 15 is secured to and spaced from the lower support plate by a plurality of posts 22.

A clutch 24 is mounted on the lower end of the shaft 14, the clutch comprising an upper clutch plate 25 that is rotatively mounted on the shaft and a lower clutch plate 26 that is fixedly mounted to the shaft. The upper clutch plate 25 is secured to a gear 28 that is also rotatively mounted on the shaft 14, and a compression spring 30, which is disposed about the shaft between the gear and the upper support plate 15, bears against the gear to normally position the upper clutch plate in engagement with the lower clutch plate 26. The engaging surfaces of the upper and lower clutch plates 25 and 26 are toothed to provide positive transmission of motion therebetween.

The disengagement of the clutch plates 25 and 26 is controlled by a relay 32, the relay having an armature 34 that extends over one end of a clutch fork 35. The clutch fork 35 is pivotally mounted between two of the posts 22 and includes a pair of arms 36, only one of which is seen, that extend into engagement with the underside of the gear 28.

When the relay 32 is energized, the armature 34 thereof is moved downward and pivots the clutch fork 35 in a clockwise direction as viewed in FIG. 1. The arms 36 of the clutch fork 35 displace the gear 28 and thereby the upper clutch plate 25 upwardly along the shaft 14, disengaging the upper clutch plate from the lower clutch plate 26. In addition, one of the arms 36 of the clutch fork 35 has a finger 38 that underlies a normally open shorting switch 40, and when the arms 36 are pivoted upward to disengage the clutch 24, the finger closes the shorting switch. The shorting switch 40 forms part of the signal generating means of the code transmitter.

Upon the de-energization of the relay 32, the compression spring 30 acting on the gear 28 biases the upper clutch plate 25 into engagement with the lower clutch plate 26. In addition, the compression spring 30 acting in conjunction with the shorting switch 40 pivots the clutch fork 35 in a counterclockwise direction, the compression spring acting through the gear 28 on the arms 36 of the clutch fork and the shorting switch acting on the finger 38 of the clutch fork. The end of the clutch fork 35 contiguous to the armature 34 of the relay 32 is thereby moved upward, and consequently the armature is moved upward.

The upper clutch plate 25 is coupled by the gear 28 and a gear train 42 to a synchronous motor 44, and when the motor is energized it rotates the upper clutch plate from right to left as viewed in FIG. 1. When the clutch 24 is engaged, this rotation of the upper clutch plate 25 is transmitted to the shaft 14, and the shaft in turn transmits the rotation of the contact disc 12.

A coil spring 45 has one end thereof fastened to the shaft 14 and the other end thereof fastened to a housing 46 depending from a mounting plate 48, the mounting plate being secured to the upper support plate 15. The rotation of the shaft 14 by the motor 44 winds up the coil spring 45 and stores energy therein, and when the clutch 24 is disengaged, the coil spring counterrotates the shaft 14 and thereby the contact disc 12 from left to right as viewed in FIG. 1. The counterrotation of the contact disc 12 is terminated upon the engagement of an arresting arm 50, which is affixed to the disc, with a stop 54 fastened to and depending from the mounting plate 48. This rest position of the contact disc 12 is referred to as the home position and for reference purposes is considered to be the normal position of the disc.

Figure 2:
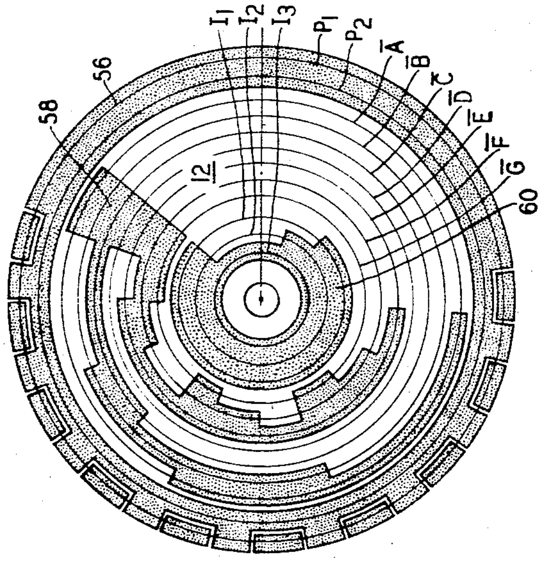
FIG. 2 is a plan view of a contact disc employed in the code transmitter.

Turning now also to FIG. 2, the contact disc 12 is composed of a dielectric material and has three electrically conductive patterns 56, 58, and 60 formed on the undersurface thereof, and these conductive patterns interact with twelve bifurcated wire spring contacts that extend into engagement with the undersurface of the disc. The contacts are identified as $P_1$, $P_2$, $\overline{A}$, $\overline{B}$, $\overline{C}$, $\overline{D}$, $\overline{E}$, $\overline{F}$, $\overline{G}$, $I_1$, $I_2$, and $I_3$, and they are mounted in a holder 62 secured to the upper support plate 15. The holder 62 insulates the contacts one from the other and retains the spacing therebetween, and it locates the contacts along a radius of the contact disc 12.

For ease of description, a grid of concentric circles is superimposed on the view of the contact disc 12 in FIG. 2 to show the paths followed by the individual contacts as the disc is rotated, and an intermittent radial line shows the location of the contacts when the disc is in the home position.

Referring to the contacts $P_1$ and $P_2$, these contacts interact with the conductive pattern 56 to provide a pulsing switch $P_{12}$. It is seen that in the home position of the contact disc 12 the contacts $P_1$ and $P_2$ engage the conductive pattern 56, and therefore the contacts are interconnected, or in other words, the pulsing switch $P_{12}$ is closed. Since the home position of the contact disc 12 is considered to be its normal position, the pulsing switch $P_{12}$ is normally closed.

The pulsing switch $P_{12}$ remains closed until the contact disc 12 is rotated through an angular distance of one hundred degrees, the disc being rotated in a counterclockwise direction as viewed in FIG. 2. Thereafter, the contact $P_1$ repeatedly moves off of the conductive pattern 56 for an angular distance of fourteen degrees and four minutes, during which time the pulsing switch $P_{12}$ is open, and then moves back on the conductive pattern for an angular distance of eight degrees and twenty-six minutes, during which time the pulsing switch $P_{12}$ is closed.

As hereinafter described, the opening and closing of the pulsing switch $P_{12}$ results in the generation of a pulse out on a telephone line, and hence one pulse is generated for every twenty-two degrees and thirty minutes of rotation. The contact disc 12 is rotated at a speed to provide one pulse every one hundred milliseconds or ten pulses per second, and each pulse has a break time of sixty-one milliseconds and a make time of thirty-nine milliseconds.

The contacts $\overline{A}$ through $\overline{G}$ interact with the conductive pattern 58 on the contact disc 12 to provide the first plurality of sequentially actuated switches or, more briefly, a plurality of first sequence switches. It is seen that in the home position none of the contacts $\overline{A}$ through $\overline{G}$ engages the conductive pattern 58, and therefore all of the first sequence switches are normally open. The first sequence switches remain open until just before the end of the first opening of the pulsing switch $P_{12}$, whereupon a conductive path is provided between the contacts $\overline{A}$ and $\overline{E}$, or in other words, the first sequence switch $\overline{AE}$ closes. Thereafter the first sequence switches close in the following order: $\overline{AF}$, $\overline{AG}$, $\overline{BE}$, $\overline{BF}$, $\overline{BG}$, $\overline{CE}$, $\overline{CF}$, $\overline{CG}$ and $\overline{DF}$.

It is seen that each of the first sequence switches closes just before the end of a concurrent opening and closing of the pulsing switch $P_{12}$. Hence a pulse is generated concurrent with each closing of a first sequence switch, a first pulse being generated concurrent with the closing of the switch $\overline{AE}$, a second pulse concurrent with the closing of the switch $\overline{AF}$, a third pulse concurrent with the closing of the switch $\overline{AG}$ and so on up to a tenth pulse concurrent with the closing of the switch $\overline{DF}$. Each first sequence switch therefore corresponds to a particular number of pulses 1 through 10, and since in a digital pulsing system, 1 through 10 pulses represent the digits 1 through 0, each first sequence switch corresponds to a particular digit 1 through 0. This correspondence is a follows:

| | |
|---|---|
| $\overline{AE}$ | 1 |
| $\overline{AF}$ | 2 |
| $\overline{AG}$ | 3 |
| $\overline{BE}$ | 4 |
| $\overline{BF}$ | 5 |
| $\overline{BG}$ | 6 |
| $\overline{CE}$ | 7 |
| $\overline{CF}$ | 8 |
| $\overline{CG}$ | 9 |
| $\overline{DF}$ | 0 |

Finally, the contacts $I_1$, $I_2$, and $I_3$ interact with the conductive pattern 60 to provide a pair of interdigital switches $I_{12}$ and $I_{23}$. In the home position of the contact disc 12 only the contact $I_3$ engages the conductive pattern 60, and thus both of the interdigital switches $I_{12}$ and $I_{23}$ are normally open. When, however, the contact disc 12 is rotated from the home position through a distance of twenty degrees, the contact $I_2$ also engages the conductive pattern 60 and the interdigital switch $I_{23}$ closes. Upon the rotation of the contact disc 12 through an additional twenty-five degrees, the contact $I_1$ also engages the conductive pattern 60 and the interdigital switch $I_{12}$ closes. Both of the interdigital switches $I_{12}$ and $I_{23}$ remain closed during the time the pulsing switch $P_{12}$ and the first sequence switches are actuated.

Figure 3:
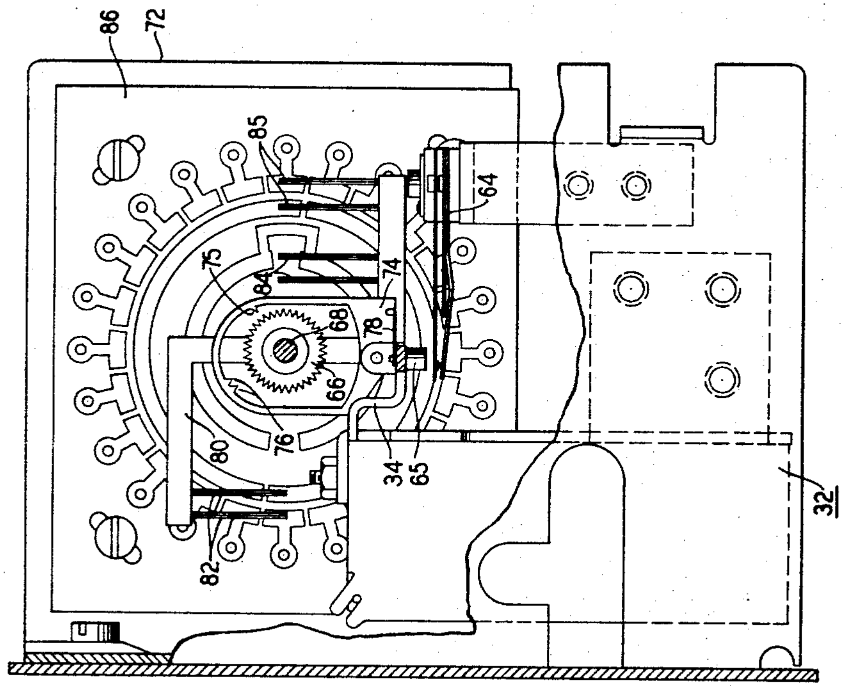
FIG. 3 is a sectional view taken along line 3—3 of FIG. 1.

Turning now to FIGS. 1 and 3, the energization of the relay 32 in addition to disengaging the clutch 24, also closes a normally open relay switch 64. An insulator 65 mounted on the armature 34 of the relay 32 overlies the contacts of the relay switch 64 and deflects the upper contact into engagement with the lower contact when the relay is energized.

Furthermore, the energization of the relay 32 rotates a twenty-four tooth ratchet wheel 66. The ratchet wheel 66 is fixedly mounted on a shaft 68 that is journaled between a pair of side plates 70 and 72, and the ratchet wheel is encompassed by a pawl 74 that is pivotally secured to the armature 34 of the relay 32. The pawl 74 includes an operating finger 75 and a pair of limiting fingers 76, the operating finger and limiting fingers being located a preselected distance apart on opposite sides of the upper end of the pawl. A wire spring 78 secured to the armature 34 biases the pawl 74 in a counterclockwise direction as viewed in FIG. 3, and thereby biases the operating finger side of the pawl against the ratchet wheel 66.

When the relay 32 is energized, the armature 34 moves the pawl 74 downward. This downward motion first moves the point of the operating finger 75 into the root of a tooth on the ratchet wheel 66 and then causes the operating finger to rotate the ratchet wheel in a clockwise direction as viewed in FIG. 3. As the operating finger 75 rotates the ratchet wheel 66, the pawl 74 itself pivots in a clockwise direction. The combined downward and clockwise movement of the pawl 74 results in the limiting fingers 76 being moved into engagement with the teeth on the opposite side of the ratchet wheel 66 from the operating finger 75, and the engagement of the limiting fingers with these teeth arrests the rotation of the ratchet wheel. The operating and limiting fingers 75 and 76 are so located that the rotation of the ratchet wheel 66 is arrested upon the completion of one twenty-fourth of a revolution.

When the relay 32 is de-energized, the armature 34 moves the pawl 74 upward. The pawl 74, under the bias of the spring 78, moves the operating finger 75 along the face of the next succeeding tooth on the ratchet wheel 66 until the operating finger moves past the crest of the tooth. At that time the pawl 74 rotates a short distance in a counterclockwise direction, and the operating finger 75 is positioned over the root of the tooth. As a result, the operating finger 75 is in position to rotate the ratchet wheel 66 upon the next energization of the relay 32. Thus upon each energization of the relay 32, the ratchet wheel 66 and thereby the shaft 68 is rotated through one twenty-fourth of a revolution.

Figure 4:
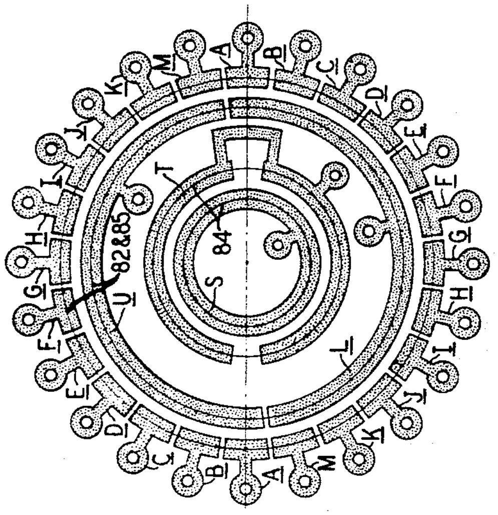
FIG. 4 is a plan view of a contact board employed in the code transmitter, portions being broken away for greater clarity.

Referring now to FIGS. 3 and 4, a contact arm 80 is fixedly mounted on the shaft 68, and hence upon each energization of the relay 32, the contact arm is rotated through one-twenty-fourth of a revolution. The contact arm 80 extends on both sides of the shaft 68 and has three contacts 82, 84, and 85 mounted thereon, each of which includes a pair of spaced bifurcations. The contacts 82, 84, and 85 extend into engagement with a contact board 86 disposed about the shaft 68 and secured to the side plate 72, and the contacts engage the board along a common diametric line.

The contact board 86 is composed of a dielectric material and has a plurality of circular electrically conductive patterns formed on the surface thereof in juxtaposition with the contacts 82, 84, and 85. The outermost pattern comprises twenty-four individual arcs, opposite pairs of which are identified as $\underline{A}$, $\underline{B}$, $\underline{C}$, $\underline{D}$, $\underline{E}$, $\underline{F}$, $\underline{G}$, $\underline{H}$, $\underline{I}$, $\underline{J}$, $\underline{K}$, and $\underline{M}$ while the adjacent pattern comprises two individual semicircles identified as $\underline{L}$ and $\underline{U}$. The innermost pattern comprises a complete circle identified as S and the pattern adjacent thereto comprises a pair of bridged semicircles identified as T. For ease of description, a grid of concentric circles is superimposed on the face of the contact board 86 in FIG. 4 to show the path followed by the contacts 82, 84, and 85 as the contact arm 80 is rotated, and an intermittent diametric line shows the location of the contacts when they are in what is considered to be the normal or home position.

As seen from FIGS. 3 and 4, the contacts 82 and 85 both engage the outermost and the next adjacent conductive patterns. In addition, the contact arm 80 is oriented with respect to the shaft 68 so that upon each rotation of the shaft, the contatcs 82 and 85 are each located midway between the ends of one of the conductive arcs $\underline{A}$ through $\underline{M}$ and on one of the conductive semicircles $\underline{L}$ and $\underline{U}$. Furthermore, since the contacts 82 and 85 are diametrically opposite to one another, both contacts engage a conductive arc bearing the same identification, and when one contact is on the conductive semicircle $\underline{L}$, the other contact is on the conductive semicircle $\underline{U}$. Consequently, in each position of the contact arm 80, the contact semicircles $\underline{L}$ and $\underline{U}$ are respectively connected to one of the conductive arcs $\underline{A}$ through $\underline{M}$.

From the foregoing it may be said that the interaction of the contacts 82 and 85 with the conductive arcs $\underline{A}$ through $\underline{M}$ and conductive semicircles $\underline{L}$ and $\underline{U}$ provides a plurality of second sequence switches, two switches being closed in each position of the contact arm 80. In the home position, only the second sequence switches $\underline{AL}$ and $\underline{AU}$ are closed, and thus they are considered to be normally closed while all the other switches are normally open. Upon the rotation of the contact arm 80 from the home position the switches close in the following order: $\underline{BL}$ and $\underline{BU}$, $\underline{CL}$ and $\underline{CU}$, $\underline{DL}$ and $\underline{DU}$, $\underline{EL}$ and $\underline{EU}$, $\underline{FL}$ and $\underline{FU}$, $\underline{GL}$ and $\underline{GU}$, $\underline{HL}$ and $\underline{HU}$, $\underline{IL}$ and $\underline{IU}$, $\underline{JL}$ and $\underline{JU}$, $\underline{KL}$ and $\underline{KU}$, and $\underline{ML}$ and $\underline{MU}$. After the contact arm 80 has rotated to an angular distance of one hundred and eighty degrees, the contacts 82 and 85 reverse positions and thus a complete sequential actuation of the second sequence switches occurs with one hundred and eighty degrees of rotation. Stated in another way, the contact arm 80 arrives at a home position after advancing through one hundred and eighty degrees of rotation.

The contact 84 on the contact arm 80 interacts with the conductive circle S and the bridged semicircle T to provide a stop switch ST. It is seen that the stop switch ST is open in the home position of the contact arm and hence the switch is normally open. In all other positions of the contact arm 80, the stop switch ST is closed.

Referring now to the schematic circuit diagram of FIG. 5, the second sequence switches, indicated by the underlined letters, are interconnected with the contacts of the first sequence switches, indicated by the overlined letters, and the particular connection between the first and second sequence switches determines the information transmitted by the code transmitter in the following manner. Each simultaneously actuated pair of second sequence switches corresponds to an individual digit in a series of digits, and since there are twelve pairs of second sequence switches, the series of digits may be twelve digits in length. A value is assigned to each individual digit by connecting the corresponding pair of second sequence switches to the contacts of the first sequence switch having the desired value.

Figure 5:
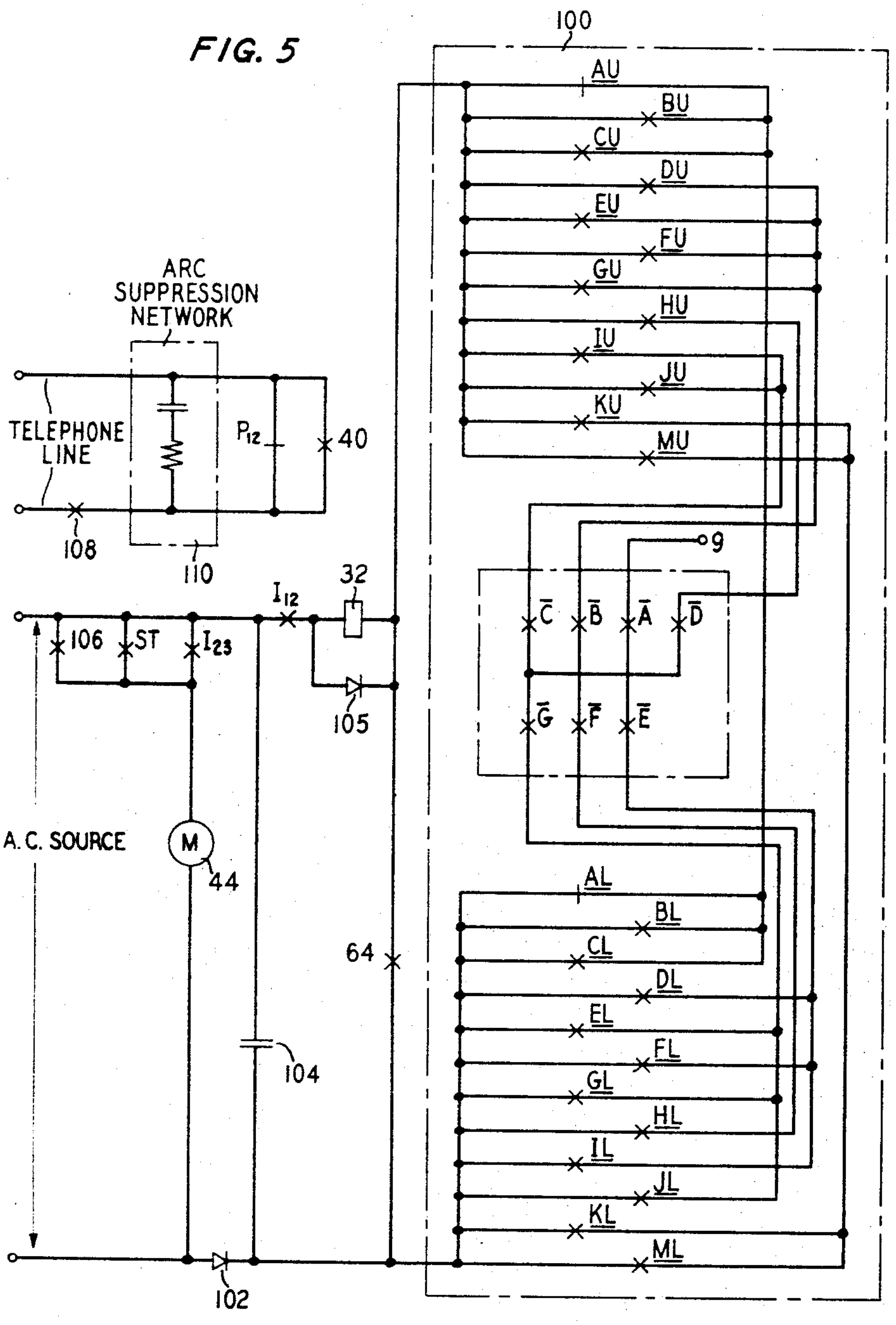
FIG. 5 is a schematic circuit diagram of the code transmitter.

In FIG. 5, the pairs of second sequence switches are connected to the contacts of the first sequence switches to transmit the number 4 6 4 6 0 7 9. This number is only seven digits in length, and hence five of the twelve digits are blank. These blank digits may be placed at the beginning of the series, at the end of the series, or apportioned between the beginning and end. In the circuit of FIG. 5, three of the five blanks are placed at the beginning of the series and two at the end, and so the number to be transmitted is more accurately said to be blank blank blank 4 6 4 6 0 7 9 blank blank.

A blank digit is achieved by connecting the corresponding pair of second sequence switches to each other, and the first three pairs of switches $\underline{AU}$ and $\underline{AL}$, $\underline{BU}$ and $\underline{BL}$, $\underline{CU}$ and $\underline{CL}$ are therefore connected to each other. A numerical digit is achieved by connecting the pair of second sequence switches corresponding to the digit to the first sequence switch having the appropriate value, the second sequence switch having the letter $\underline{U}$ being connected to one of the first sequence contacts $\overline{A}$ through $\overline{D}$ and the second sequence switch having the letter $\underline{L}$ being connected to one of the first sequence contacts $\overline{E}$ through $\overline{G}$. Thus, for example, the fourth digit in this series is the digit 4, and as the first sequence switch $\overline{BE}$ corresponds to the digit 4, the second sequence switch $\underline{DU}$ is connected to the contact $\overline{B}$ and the second sequence switch $\underline{DL}$ is connected to the contact $\overline{E}$. The fifth digit in this series is the digit 6, and as the first sequence switch $\overline{BG}$ corresponds to the digit 6, the second sequence switch $\underline{EU}$ is connected to the contact $\overline{B}$ and the second sequence switch $\underline{EL}$ is connected to the contact $\overline{G}$. The sixth digit in this series is again digit 4 and thus the second sequence switches $\underline{FU}$ and $\underline{FL}$ are respectively connected to the same first sequence contacts as the second sequence switches $\underline{DU}$ and $\underline{DL}$. The remaining digits in this series are achieved in a like manner.

Figure 6:
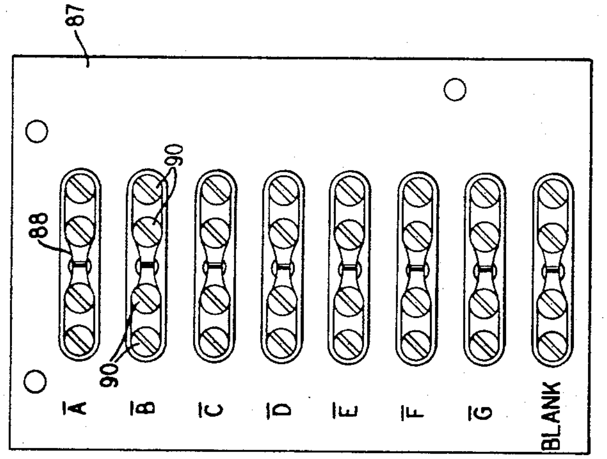
FIG. 6 is a plan view of a terminal board for interconnecting the first and second sequence switches of the code transmitter.

The means by which the first and second sequence switches are interconnected is advantageously determined by how the code transmitter is to be employed. If the code transmitter is to be used in a situation where changes in the information transmitted thereby will be infrequent, such as where the code transmitter is employed as a single number code transmitter, the first and second sequence switches may be interconnected on a terminal board 87 such as is shown in FIG. 6. A lead from each first sequence contact is fixedly connected to the backside of an associated individual bus bar 88, each bus bar having four screw terminals 90 threaded into the frontside thereof. Leads from the second sequence switches are then detachably connected to the appropriate bus bars 88 by means of the screw terminals 90.

Figure 7:
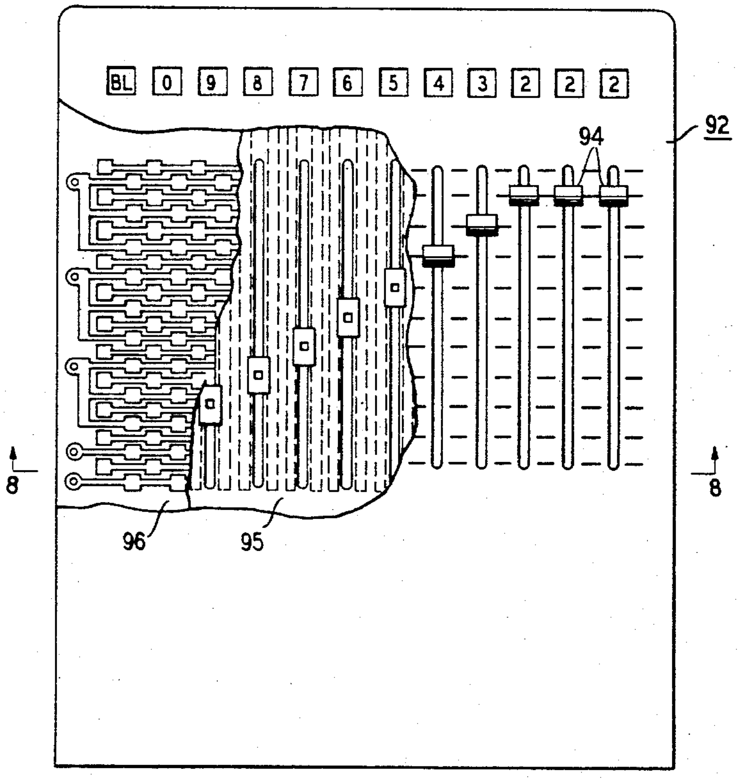
FIG. 7 is a plan view of a crossbar connector for interconnecting the first and second sequence switches of the code transmitter portions being broken away to show the structure thereof.
Figure 8:
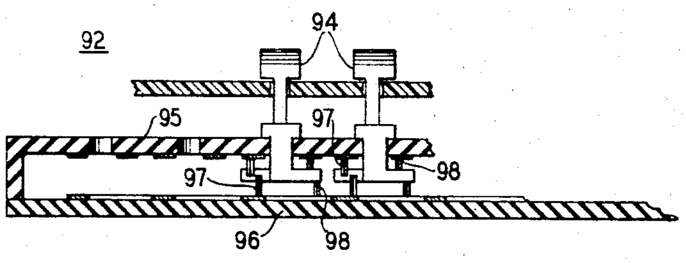
FIG. 8 is a sectional view taken along line 8—8 of FIG. 7.

If, on the other hand, the code transmitter is to be used in a situation where changes in the information transmitted thereby will be frequent, such as where the code transmitter is employed as a preset call transmitter, the first and second sequence switches may be interconnected by means of crossbar connector 92, such as shown in FIGS. 7 and 8. The connector 92 has twelve selectors 94 that are slidably displaceable in a vertical direction between two printed circuit boards 95 and 96. The printed circuit board 95 has twenty-four vertical conductive strips thereon, each adjacent pair of vertical conductive strips being respectively connected to an individual pair of simultaneously actuated second sequence switches. The printed circuit board 96 has twenty-two horizontal conductive strips thereon, an individual pair of horizontal strips being respectively connected to the contacts comprising each first sequence switch and an individual pair of horizontal strips being connected together. Each selector 94 has two contacts 97 and 98 mounted thereon, each of which engages both printed circuit boards 95 and 96, and as a selector is moved from one position to another each contact thereon maintains engagement with one of the vertical contact strips and moves from one horizontal strip to another. The contacts on each selector 94 thereby connect an individual pair of second sequence switches to any one of the first sequence switches or to each other depending upon the position in which the selector is placed.

Referring again to FIG. 5, the interconnection of the second sequence switches with the first sequence switches and with each other provides a switching matrix 100. The switching matrix 100 is connected in series with the relay 32 and the normally open interdigital switch $I_{12}$ across a source of alternating current, but a rectifying diode 102 connected in series with and a capacitor 104 connected in parallel with the switching matrix, relay, and interdigital switch provides direct current thereto. In addition, the switching matrix 100 is shunted by the normally open relay switch 64 while the relay 32 is shunted by a voltage regulating diode 105. Finally, the motor 44 is also connected across the source of alternating current through either the normally open interdigital switch $I_{23}$, the normally open stop switch ST, or a normally open start switch 106.

In an associated but independent circuit, the normally closed pulsing switch $P_{12}$ is connected in series with a normally open line switch 108 across a telephone line. The pulsing switch $P_{12}$ is shunted by the normally open shorting switch 40 and an arc suppression network 110.

*Description of operation*

The operation of the code transmitter is initiated by the closing of the normally open line switch 108, whereby the telephone line is seized, and by the closing of the normally open start switch 106, whereby the motor 44 is connected across the alternating current power source and energized. The line and start switches 108 and 106 are either manually actuated by an individual or are automatically actuated in response to the occurrence of a particular condition. In the case where the switches are manually actuated, the individual operating the code transmitter first closes the normally open line switch 108 and then, upon observing a dial tone on the telephone line, closes the normally open start switch 106. In the case where the switches are automatically actuated, the line and start switches 108 and 106 may be closed simultaneously, they may be closed sequentially with a fixed period of delay between their actuation, or only the line switch may be closed in response to the occurrence of the particular condition with the start switch being closed in response to the operation of a dial tone detector.

The energized motor 44 acting through the gear train 42, the gear 28, and the clutch 24 rotates the contact disc 12 in a counterclockwise direction as viewed in FIG. 2, and upon the rotation of the disc through twenty degrees, the normally open interdigital switch $I_{23}$ closes. This provides an alternate path to that provided by the start switch 106 for connecting the motor 44 across the source of alternating current, and hence the start switch is able to open without de-energizing the motor. Thus regardless of whether the start switch 106 is actuated manually or automatically, it need only remain closed for a brief duration.

Upon the rotation of the contact disc 12 through an additional twenty-five degrees of rotation, the normally open interdigital switch $I_{12}$ closes and the switching matrix 100 and relay 32 are connected across the power source. The contact arm 80 is in the home position whereby the second sequence switches $\underline{AU}$ and $\underline{AL}$ are closed, and since these two switches are connected together, a path is immediately provided through the switching matrix. Current flows from one side of the power source through the rectifying diode 102, the normally closed sequence switches $\underline{AL}$ and $\underline{AU}$, the relay 32, and the closed normally open interdigital switch $I_{12}$ to the other side of the power source, and the relay is energized.

The energization of the relay 32 moves the armature 34 thereof downward, and the downward movement of the armature closes the normally open relay switch 64, moves the pawl 74 into engagement with the ratchet wheel 66, and rotates the clutch fork 35. The closed relay switch 64 places a short across the switching matrix 100 to maintain the connection of the relay 32 across the power source irrespective of whether a path is provided through the switching matrix. The engagement of the pawl 74 with the ratchet wheel 66 rotates the ratchet wheel and thereby the contact arm 80 through one twenty-fourth of a revolution, and as a result the normally closed second sequence switches $\underline{AU}$ and $\underline{AL}$ open, the normally open second sequence switches $\underline{BU}$ and $\underline{BL}$ close, and the normally open stop switch ST closes.

Finally, the rotation of the clutch fork 35 causes the arms 36 thereof to disengage the upper clutch plate 25 from the lower clutch plate 26 and causes the finger 38 thereof to close the normally open shorting switch 40. The motor 44 continues to drive the gear train 42 and thereby rotates the gear 28 and upper clutch plate 25 about the shaft 14, but with the disengagement of the clutch 24, the only force acting on the shaft is the bias of the coil spring 45. Hence the coil spring 45 counterrotates the shaft 14 and thereby the contact disc 12 until the rotation is terminated by the engagement of the arresting arm 50 mounted on the disc with the bumper 52 on the stop 54, at which point the disc is in the home position.

When the contact disc 12 counterrotates to the forty-five degree position, the closed normally open interdigital switch $I_{12}$ opens and disconnects the relay 32 from tht power source. The relay 32 is thereupon de-energized, but due to the inertia of the system, the contact disc 12 is able to counterrotate to the home position before any change occurs due to the relay's de-energization. In addition, when the contact disc 12 counterrotates to the twenty degree position, the closed normally open interdigital switch $I_{23}$ opens. However, the closed normally open stop switch ST maintains the connection of the motor 44 across the power source.

The de-energization of the relay 32 permits the compression spring 30 to move the upper clutch plate 25 into engagement with the lower clutch plate 26, permits the closed normally open shorting switch 40 to open, and permits the closed normally open relay switch 64 to open. The contact disc 12 is once more coupled to the motor 44, and the motor commences to rotate the disc from the home position a second time. Since the closed normally open second sequence switches $\underline{BU}$ and $\underline{BL}$ are connected together, a path is immediately provided through the switching matrix 100 and the relay 32 is again energized upon the closing of the normally open interdigital switch $I_{12}$, whereby the sequence of operation set forth above is essentially repeated. Likewise, upon the third rotation of the contact disc 12 from the home position, the normally open second sequence switches $\underline{CU}$ and $\underline{CL}$ are closed, and because these switches are connected together, this sequence of operation is repeated once more.

In the case where the line and start switches 108 and 106 are simultaneously actuated in response to the occurrence of a particular condition, the time that elapses during these three rotations of the disc 12 from the home position and back to the home position virtually assures that a dial tone is present on the telephone line at the time the fourth rotation of the disc commences.

During the fourth through tenth rotations of the contact disc 12 from the home position, the closed normally open second sequence switches are connected to the first sequence contacts rather than to each other, and therefore no path is immediately provided through the switching matrix 100. The closing of the normally open interdigital switch $I_{12}$ does not connect the relay 32 across the power source, and the rotation of the contact disc 12 continues. After the contact disc 12 has rotated through an angular distance of one hundred degrees, the normally closed pulsing switch $P_{12}$ commences to open and close, thereby interrupting the telephone line and transmitting pulses thereover. In addition, concurrent with each pulse one of the first sequence switches closes, and when the particular first sequence switch to which the closed second sequence switches are connected closes, a path is provided through the switching matrix 100 and the relay 32 is energized.

Thus, upon the fourth rotation of the contact disc 12 from the home position, the normally open second sequence switches $\underline{\text{DU}}$ and $\underline{\text{DL}}$ are closed and they are respectively connected to the first sequence contacts $\overline{\text{B}}$ and $\overline{\text{E}}$ Concurrent with the fourth pulse, the normally open first sequence switch $\overline{\text{BE}}$ closes and a path is provided through the switching matrix 100 at that time. The relay 32 is energized and, as before, the energization of the relay (1) closes the normally open relay switch 64, thereby providing a shunt around the switching matrix 100, (2) advances the contact arm 80 one-twenty-fourth of a revolution, thereby opening the closed normally open second sequence switches $\underline{\text{DU}}$ and $\underline{\text{DL}}$ and closing the normally open second sequence switches $\underline{\text{EU}}$ and $\underline{\text{EL}}$, (3) disengages the clutch 24, thereby permitting the coil spring 45 to return the contact disc 12 to the home position, and (4) closes the normally open shorting switch 40. The normally open shorting switch 40 provides a shunt around the normally closed pulsing switch $P_{12}$ so that the opening and closing of the pulsing switch as the contact disc 12 returns to the home position does not interrupt the telephone line.

The code transmitter repeats the above pattern of operation for each of the remaining digits in the series and upon completion of the twelfth digit, the contact arm 80 advances to the home position. The closed normally open stop switch ST thereupon opens and the motor 44 is deenergized to terminate the operation of the code transmitter.

Where the normally open line switch 108 was manually closed, it is subsequently opened by the individual using the code transmitter. Where the normally open line switch 108 was automatically closed, an end of dialing detector may be employed to open the line switch and connect some other equipment across the telephone line responsive to the completion of the twelfth digit, that is, responsive to the flow of current between the second sequence switches $\underline{\text{MU}}$ and $\underline{\text{ML}}$.

What is claimed is:

1. A code transmitter comprising:

a first switch actuator;

a plurality of first switches sequentially actuated in a fixed order responsive to movement of the first switch actuator from a rest position;

means for transmitting a signal concurrent with each actuation of a first switch;

a second switch actuator;

a plurality of second switches sequentially actuated in a fixed order responsive to movement of the second switch actuator, a unique second switch being actuated for each sequential actuation of the first switches;

a switching matrix comprising certain of the first switches connected to certain of the second switches; and means responsive to the provision of a path through the switching matrix for returning the first switch actuator to its rest position to terminate one group of signals and prepare for the initiation of a subsequent group of signals, and for advancing the second switch actuator to actuate the next second switch in the sequence.

2. A code transmitter comprising:

a first member having a particular pattern of conductive and nonconductive areas thereon;

a plurality of first contacts extending into engagement with the conductive and nonconductive areas on the first pattern member;

motive means for moving the first pattern member relative to the first contacts, the interaction between the first contacts and the conductive and nonconductive areas on the first pattern member providing a plurality of first sequentially actuated switches;

clutch means for connecting the motive means to the first pattern member;

biasing means energized by the movement of the first pattern member from a rest position for returning the first pattern member to the rest position when the clutch means is disengaged;

means for generating a pulse concurrent with each actuation of a first sequentially actuated switch;

a second member having a particular pattern of conductive and nonconductive areas thereon;

a plurality of second contacts extending into engagement with the conductive and nonconductive areas on the second pattern member;

means for moving the second contacts relative to the second pattern member, the interaction between the second contacts and the conductive and nonconductive areas on the second pattern member providing a plurality of second sequentially actuated switches;

a switching matrix comprising certain of the first sequentially actuated switches interconnected with certain of the second sequentially actuated switches;

means responsive to the provision of a path through the switching matrix for disengaging the clutch means whereby the biasing means returns the first pattern member to its rest position;

means responsive to the provision of a path through the switching matrix for advancing the moving means of the second contacts; and means responsive to the provision of a path through the switching matrix for preventing the generation of pulses during the return of the first pattern member to its rest position.

3. A code transmitter comprising:

a first member having a particular pattern of conductive and nonconductive areas thereon;

a plurality of first contacts extending into engagement with the conductive and nonconductive areas on the first pattern member;

a motor for rotating the first pattern member relative to the first contacts, the motor rotating the first pattern member from a rest position in a particular direction, the interaction between the first contacts and the conductive and nonconductive areas on the first pattern member providing a plurality of first sequentially actuated switches and a pulsing switch;

a normally engaged clutch for connecting the motor to first pattern member;

a spring member energized by the rotation of the first pattern member in the particular direction for returning the first pattern member to the rest position when the clutch is disengaged;

a second member having a particular pattern of conductive and nonconductive areas thereon;

a plurality of second contacts extending into engagement with the conductive and nonconductive areas on the second pattern member;

a ratchet wheel and pawl for rotating the second contacts through discrete distances relative to the second pattern member, the interaction between the second contacts and the conductive and nonconductive areas on the second pattern member providing a plurality of second sequentially actuated switches;

a switching matrix comprising certain of the first sequentially actuated switches interconnected with certain of the second sequentially actuated switches;

a relay connected in series with the switching matrix;

means for connecting the pulsing switch across a telephone line;

means for connecting the motor across a source of electromotive force, the motor when energized rotating the second pattern member whereby the second sequentially actuated switches are sequentially actuated and the pulsing switch is actuated concurrent with each actuation of a second sequentially actuated switch to interrupt the telephone line and to transmit a pulse thereover;

means for connecting the relay and switching matrix across the source of electromotive force, the provision of a path through the switching matrix energizing the relay;

means responsive to the energization of the relay for disengaging the clutch whereby the spring member is permitted to return the first pattern member to its rest position;

means responsive to the energization of the relay for shorting the pulsing switch; and means responsive to the energization of the relay for operating the pawl and ratchet wheel for advancing the second contacts through a discrete distance to actuate another second sequentially actuated switch.

References Cited

UNITED STATES PATENTS

| | | |
|---|---|---|
| 3,320,369 | 5/1967 | Hershey et al. |
| 1,972,289 | 9/1934 | Chauveau. |

KATHLEEN H. CLAFFY, *Primary Examiner.*

A. H. GESS, *Assistant Examiner.*